US010579806B1

(12) United States Patent
Pyo et al.

(10) Patent No.: US 10,579,806 B1
(45) Date of Patent: Mar. 3, 2020

(54) SYSTEMS AND METHODS FOR DYNAMIC REENCRYPTION OF CODE POINTERS

(71) Applicant: Zeus SW Defender, LLC, Lexington, MA (US)

(72) Inventors: Changwoo Pyo, Seoul (KR); Hyungyu Lee, Seoul (KR); Gyungho Lee, Namyangju-si (KR)

(73) Assignee: Zeus SW Defender, LLC, Lexington, MA (US)

( * ) Notice: Subject to any disclaimer, the term of this patent is extended or adjusted under 35 U.S.C. 154(b) by 0 days.

(21) Appl. No.: 16/551,796

(22) Filed: Aug. 27, 2019

(51) Int. Cl.
*G06F 11/30* (2006.01)
*G06F 21/60* (2013.01)
*H04L 9/06* (2006.01)
*G06F 9/445* (2018.01)
*H04L 9/08* (2006.01)
*G06F 12/14* (2006.01)

(52) U.S. Cl.
CPC ........ *G06F 21/602* (2013.01); *G06F 9/44521* (2013.01); *H04L 9/06* (2013.01); *H04L 9/0891* (2013.01)

(58) Field of Classification Search
None
See application file for complete search history.

(56) References Cited

U.S. PATENT DOCUMENTS

| 8,631,248 | B2* | 1/2014 | Cowan | G06F 12/1408 713/190 |
| 9,037,872 | B2* | 5/2015 | Kaplan | G06F 21/54 713/187 |
| 9,514,305 | B2* | 12/2016 | Acar | G06F 21/554 |
| 9,811,441 | B2* | 11/2017 | Santhanakrishnan | G06F 11/3604 |
| 2008/0109625 | A1* | 5/2008 | Erlingsson | G06F 12/0802 711/163 |
| 2009/0113217 | A1* | 4/2009 | Dolgunov | G06F 12/1408 713/190 |
| 2013/0067245 | A1* | 3/2013 | Horovitz | G06F 12/1408 713/193 |

(Continued)

*Primary Examiner* — Gary S Gracia
(74) *Attorney, Agent, or Firm* — Womble Bond Dickinson (US) LLP; John J. Penny, Jr.

(57) ABSTRACT

Present disclosure provides the system and method for protecting the control-flow of a computer program against manipulation and leak of code pointers during program execution. The system includes a memory that a computer program is loaded onto and a processor which executes the computer program for protecting the control-flow of a program against manipulation and leak of code pointers during program execution. The method includes providing a shadow stack for each process and thread of the computer program in a thread local storage (TLS). Each code pointer is encrypted with the corresponding encryption key, the pair with a global key is encrypted, and reencryption of the code pointer at runtime is performed. The performing the reencryption of the code pointer includes renewing the corresponding encryption key in the shadow stack, and renewing the encryption state of the code pointer with a renewed encryption key when the computer program enters a code region vulnerable to a memory corruption or leak attack, such that one or more renewed encryption keys govern one or more corresponding code pointers through encryption while changing before the control-flow proceeds into the vulnerable region.

29 Claims, 12 Drawing Sheets

(56) References Cited

U.S. PATENT DOCUMENTS

| | | | |
|---|---|---|---|
| 2016/0283714 A1* | 9/2016 | LeMay | G06F 21/56 |
| 2017/0109210 A1* | 4/2017 | Goossens | G06F 8/44 |
| 2017/0364452 A1* | 12/2017 | Okhravi | G06F 11/1048 |
| 2017/0372061 A1* | 12/2017 | Penzin | G06F 21/44 |
| 2018/0089427 A1* | 3/2018 | Branco | H04L 9/14 |

* cited by examiner (a) No encryption (b) Static encryption (c) Dynamic reencryption

FIG. 6

SYSTEMS AND METHODS FOR DYNAMIC REENCRYPTION OF CODE POINTERS

FIELD

The present disclosure relates to dynamic reencryption of code pointers. In particular, the present disclosure relates to methods and systems for securing return addresses and the function pointers in the global offset table (GOT) using dynamic reencryption at runtime.

BACKGROUND

Protecting computer memory is critical in program security because most of the security breaches related to programs start with compromising memory. Specifically, adversaries can disclose or divert control-flow by overwriting a code pointer. As mitigation of the vulnerability, researchers have developed the methods for the obfuscation of code pointers and monitoring integrity of control-flow. Obfuscation hides critical information by randomizing memory contents and the locations of program components. Among the methods of obfuscation for code pointers, encryption has been successful in its effectiveness and cost. Since decryption should precede dereferencing an encrypted pointer, an adversary cannot compromise the pointer to get what they want without knowing how to decrypt the pointer.

However, the effectiveness of code pointer encryption diminishes significantly if the state of encryption stays fixed during program execution because writable memory is not free from information leaks as demonstrated in new offensive arts, for example, incremental brute-force memory reading, crash-resistance, and side-channel analysis. Disclosed control-flow information is useful for crafting exploits of control-flow interception and another information leak. It does not matter whether the pointers are encrypted or not. Though it may take considerable time, an attacker may still be able to break the encryption using various available runtime data. Even worse, an adversary can launch a code reuse attack by overwriting an encrypted code pointer with another disclosed if the two pointers share a key.

SUMMARY

In one aspect of the present disclosure, there is provided a method for protecting the control-flow of a computer program against manipulation and leak of code pointers during program execution. The method includes providing a shadow stack for each process and thread of the computer program, in a thread local storage (TLS), wherein for each code pointer of the process and thread, the shadow stack stores a pair of the address of the code pointer and the corresponding encryption key. Each code pointer is encrypted with the corresponding encryption key, the pair with a global key is encrypted, and reencryption of the code pointer at runtime is performed. The performing the reencryption of the code pointer includes renewing the corresponding encryption key in the shadow stack, and renewing the encryption state of the code pointer with a renewed encryption key when the computer program enters a code region vulnerable to a memory corruption or leak attack, such that one or more renewed encryption keys govern one or more corresponding code pointers through encryption while changing before the control-flow proceeds into the vulnerable region.

In another aspect of the present disclosure, there is provided an apparatus that includes a memory that a computer program is loaded onto and a processor which executes the computer program for protecting the control-flow of a program against manipulation and leak of code pointers during program execution. The apparatus includes a shadow stack generation module configured to provide a shadow stack for each process and thread of the computer program, in a thread local storage (TLS), wherein for each code pointer of the process and thread, the shadow stack stores a pair of the address of the code pointer and the corresponding encryption key. The apparatus further includes an encryption module configured to encrypt each code pointer with the corresponding encryption key, and encrypt the pair with a global key, and a dynamic reencryption module configured to perform reencryption of the code pointer at runtime. The performing the reencryption of the code pointer includes renewing the corresponding encryption key in the shadow stack, and renewing the encryption state of the code pointer with a renewed encryption key when the computer program enters a code region vulnerable to a memory corruption or leak attack, such that one or more renewed encryption keys govern one or more corresponding code pointers through encryption while changing before the control-flow proceeds into the vulnerable region.

In yet another aspect of the present disclosure, there is provided a non-transitory computer readable medium for protecting the control-flow of a computer program against manipulation and leak of code pointers during program execution, the non-transitory computer readable medium comprising a set of instructions. The set of instructions when executed by a processor causes the processor to provide a shadow stack for each process and thread of the computer program, in a thread local storage (TLS), wherein for each code pointer of the process and thread, the shadow stack stores a pair of the address of the code pointer and the corresponding encryption key; encrypt each code pointer with the corresponding encryption key, encrypt the pair with a global key, and perform reencryption of the code pointer at runtime. The set of instructions when executed by the processor causes the processor to renew the corresponding encryption key in the shadow stack, and renew the encryption state of the code pointer with a renewed encryption key when the computer program enters a code region vulnerable to a memory corruption or leak attack, such that one or more renewed encryption keys govern one or more corresponding code pointers through encryption while changing before the control-flow proceeds into the vulnerable region.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description applies to any one of the similar components having the same first reference label irrespective of the second reference label.

FIG. 6 illustrates screen views of responses of programs protected by dynamic reencryption of return addresses to information leak attacks, in accordance with some embodiments.

DETAILED DESCRIPTION

Figure 1:
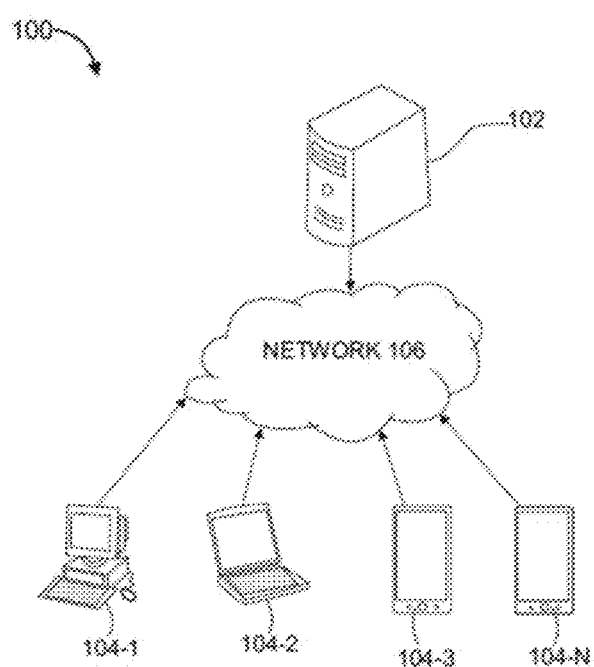
FIG. 1 illustrates a network implementation of the present system and method for performing dynamic reencryption of code pointers, in accordance with some embodiments of the present subject matter.

The disclosed system and method perform dynamic reencryption of the code pointers that may include return addresses and the function pointers in the GOT (Global Offset Table) for shared objects (dynamic linking libraries). Hereafter, code pointers collectively refer to both the return addresses and the function pointers in the GOP.

Embodiments of the present disclosure include various steps, whose descriptions follow. The steps may be performed by hardware components or may be embodied in machine-executable instructions, which a general-purpose or special-purpose processor may execute to perform the steps. Alternatively, a combination of hardware, software, firmware, and/or human operators may perform the steps.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer programs coded in accordance with various methods described herein, and the method steps of the disclosure could be accomplished by modules, routines, subroutines, or subparts of a computer program product.

The present disclosure explicates systems and methods for protecting the code pointers whereby dynamic reencryption of return addresses and the function pointers in the GOT mitigates their leakage and control-flow diversion. The present methods enforce software programs to save code pointers as encrypted and to decrypt the code pointers before dereferencing. For instance, when a function returns to its caller, it should restore the return address from its encryption using the most recent encryption key not to cause a crash. During the lifetime of the code pointers, programs renew the encryption states of the code pointers with a new set of encryption keys in a periodic or aperiodic mode. Periodic reencryption regularly updates the states of encryption of code pointers by using interval timer interrupt. A periodic reencryption is performed irregularly before or after vulnerable operations. Under the protection of the present method, the code pointers and encryption keys may leak, but the leaked bits become garbage because the encryption keys govern all the code pointers through encryption whose states would have changed before exploitation. As a result, it becomes probabilistically infeasible to build exploits by using the leaked code pointers or encryption keys. The protection by encryption and dynamic reencryption holds for both return addresses and the function pointers in the GOT.

Although the present disclosure has been described with the purpose of performing dynamic reencryption of return addresses and the function pointers in the GOT, it should be appreciated that the same has been done merely to illustrate the disclosure in an exemplary manner, and any other purpose or function for which explained structures or configurations could be used is covered within the scope of the present disclosure.

Exemplary embodiments is now described more fully hereinafter with reference to the accompanying drawings, in which exemplary embodiments are shown. This disclosure may, however, be embodied in many different forms and should not be construed as limited to the embodiments set forth herein. These embodiments are provided so that this disclosure would be thorough and complete and fully convey the scope of the disclosure to those of ordinary skill in the art. Moreover, all statements herein reciting embodiments of the disclosure, as well as specific examples thereof, are intended to encompass both structural and functional equivalents thereof. Additionally, such equivalents include both currently known equivalents as well as those developed in the future (i.e., any elements developed that perform the same function, regardless of structure).

Thus, for example, it would be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any flowchart shown in the figures is conceptual only. Their functions may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular name.

Specific details are given in the following description to provide a thorough understanding of the embodiments. However, it would be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail to avoid obscuring the embodiments.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored, and that does not include carrier waves and/or transitory electronic signals propagating wirelessly or over wired connections. Examples of a non-transitory medium may include but are not limited to, a magnetic disk or tape, optical storage media such as compact disk (CD) or versatile digital disk (DVD), flash memory, or memory devices.

FIG. 1 illustrates a network implementation 100 of a system and method for performing dynamic reencryption of return addresses and the function pointers in the GOT for shared objects, in accordance with an embodiment of the present subject matter. Although the present subject matter is explained considering that a system 102 is implemented on a server, it may be understood that the system 102 may also be implemented in a variety of computing systems, such as a laptop computer, a desktop computer, a notebook, a workstation, a mainframe computer, a server, a network server, and the like. It would be understood that multiple users may access the system 102 through one or more computing devices 104-1, 104-2, . . . , 104-N, collectively referred to as computing unit 104 hereinafter, or applications residing on the computing unit 104. Examples of the computing unit 104 may include but are not limited to a portable computer, a personal digital assistant, a handheld or mobile device, smart devices, and a workstation. The computing units 104 are communicatively accessible to the present system 102 through a network 106.

In one implementation, the network 106 may be a wireless network, a wired network, or a combination thereof. The network 106 can be implemented as one of the different types of networks, such as an intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

Figure 2A:
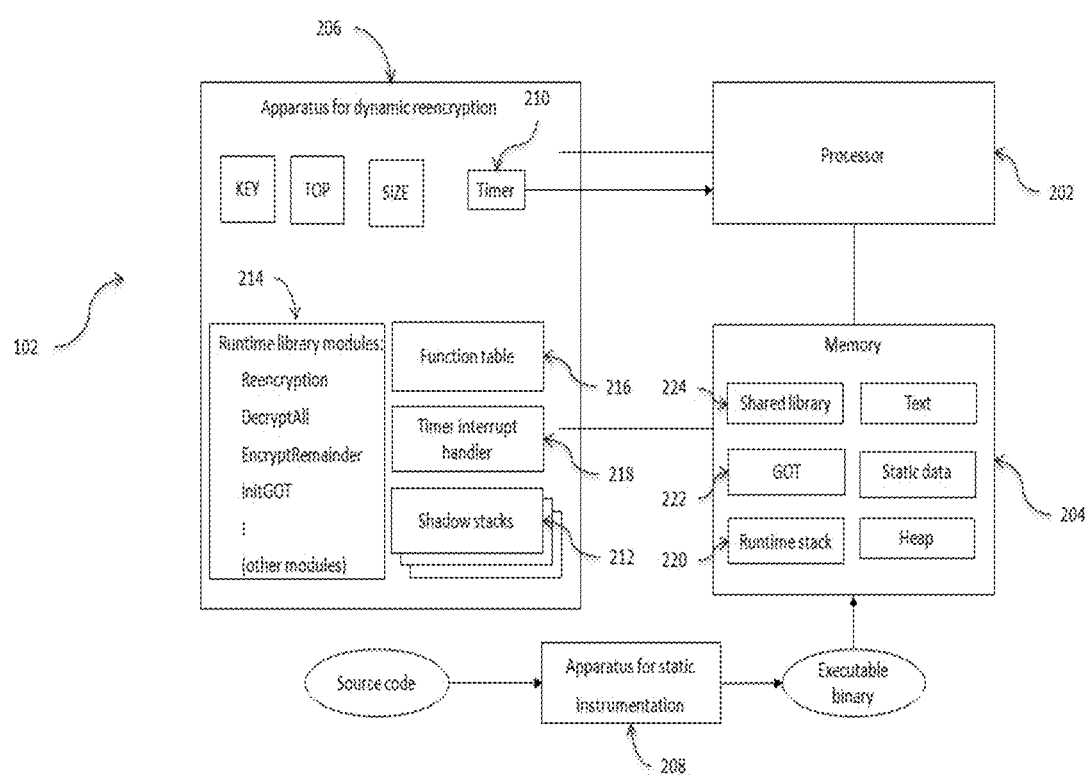
FIG. 2a illustrates a block diagram of the present dynamic reencryption system, in accordance with some embodiments of the present subject matter.

FIG. 2a illustrates a block diagram of the dynamic reencryption system 102 for the protection of return addresses in the runtime stack 220 and the function pointers in the GOT 222 in accordance with an embodiment of the present subject matter. The system 102 may include at least one processor 202, a memory 204, an apparatus for dynamic reencryption 206, and an apparatus for static instrumentation 208. The processor 202 may be implemented as one or more microprocessors, microcomputers, microcontrollers, digital signal processors, central processing units, state machines, logic circuitries, and/or any devices that manipulate signals based on operational instructions. Among other capabilities, at least one processor 202 is configured to fetch and execute instructions stored in the memory 204.

The present method and system use the XOR instruction for both encryption and decryption of bits because of its ubiquity in microprocessors and low performance overhead. However, the XOR instruction cannot resist information leak attacks because XOR is involutional. Suppose r and e are a code pointer and its ciphertext, respectively, that is, e=XOR(k, r), where k is an encryption key. If an attack leaks r and e, the key k is inferable by k=XOR(e, r). Adversaries can read the return address r and its encrypted text e through stack reading or a side-channel attack such as timing analysis. Disclosing target system information such as return addresses does not require directly probing the target. Since deployed system software and microprocessors are not diverse enough to hinder guessing what they are, attackers can build an identical system and gather various properties of the target such as memory layout and its security measures. After all, attackers can draw a layout of virtual memory and the stack frame. On the other hand, if a cryptographically secure algorithm is employed instead of the XOR, the program would slow down to an unacceptable level. Therefore, the present method and system adopt the XOR instruction for crypto work with additional measures of security.

The memory 204 may include any computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes. The memory 204 stores the runtime stack 220, the GOT 222, and shared libraries 224, where they are necessary for executing programs in general.

The apparatus for dynamic encryption 206 may include hardware registers KEY, TOP, and SIZE. Register KEY stores the global key for randomizing the keys in the shadow stack 212, and register TOP is the shadow stack pointer. Register SIZE records the number of entries in the shadow stack. Registers KEY, TOP, and SIZE are dedicated to their intended usage by each process or thread, and the registers do not spill into memory while the process or thread is active. Other components of the apparatus 206 include the interval timer 210, the shadow stack 212, the runtime library 214, the table of vulnerable functions 216, and the timer interrupt handler 218. These components are explicated in the following disclosure.

Figure 2B:
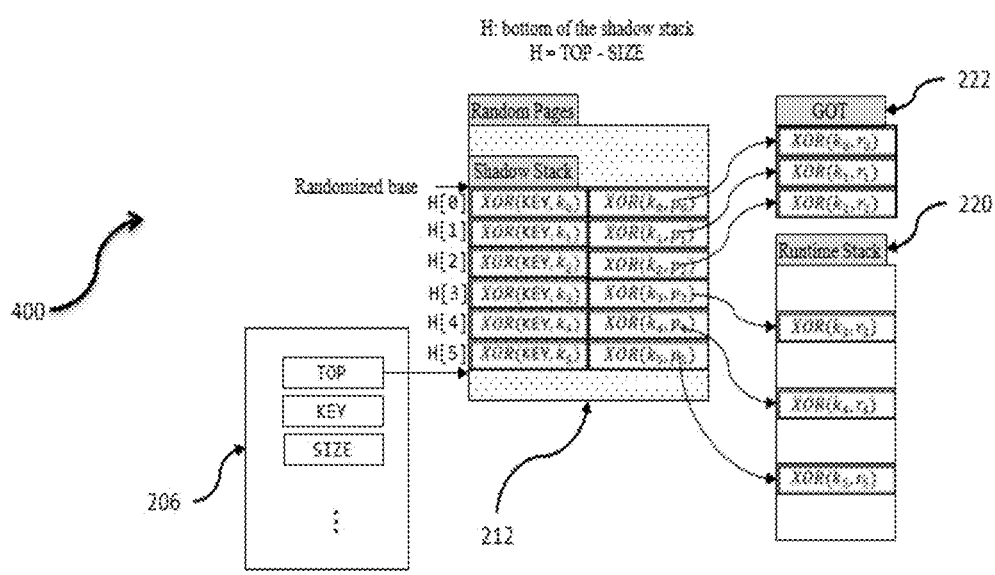
FIG. 2b illustrates a shadow stack's structure and relationship with other data, in accordance with some embodiments.

The shadow stack 212 of the apparatus 206 is configured to store a private key for each protected data. FIG. 2b illustrates the structure 400 of the shadow stack 212 and the relationship of the shadow stack with other data and components, in accordance with at least one embodiment. The shadow stack 212 is provided for each process and thread, differentiating keys per protected data as well as processes and threads. The bottom of the shadow stack is denoted by H. Each entry H[i] of the shadow stack 212 keeps a pair {$k_i$, $p_i$} of an encryption key $k_i$ and a pointer $p_i$ to a protected data in memory, where the data pointed by $p_i$ is encrypted with the key $k_i$. The protected data is either a return address or a function pointer in the GOT. The lower part near to the bottom of the shadow stack keeps track of the function pointers in the GOT. In one embodiment, a shadow stack may be installed in the thread local storage (TLS), which is a global memory exclusive to each thread without being shared among threads. In another embodiment, the shadow stack 212 may exist in kernel memory. In this embodiment, the shadow stack 212 is safer than in other embodiments with the shadow stack 212 in user memory because the kernel memory is not directly accessible from user-level processes.

Encrypting a code pointer with an individual non-shared key minimizes damage when the control-flow information leaks because the leakage and attacks using the leaked information can occur at different times or locations of a program forking multiple processes or threads. Though a process or thread may crash disclosing the shared key as a consequence of an attack, other siblings and the parent can still survive and thus be attacked with the disclosed key.

Figure 2C:
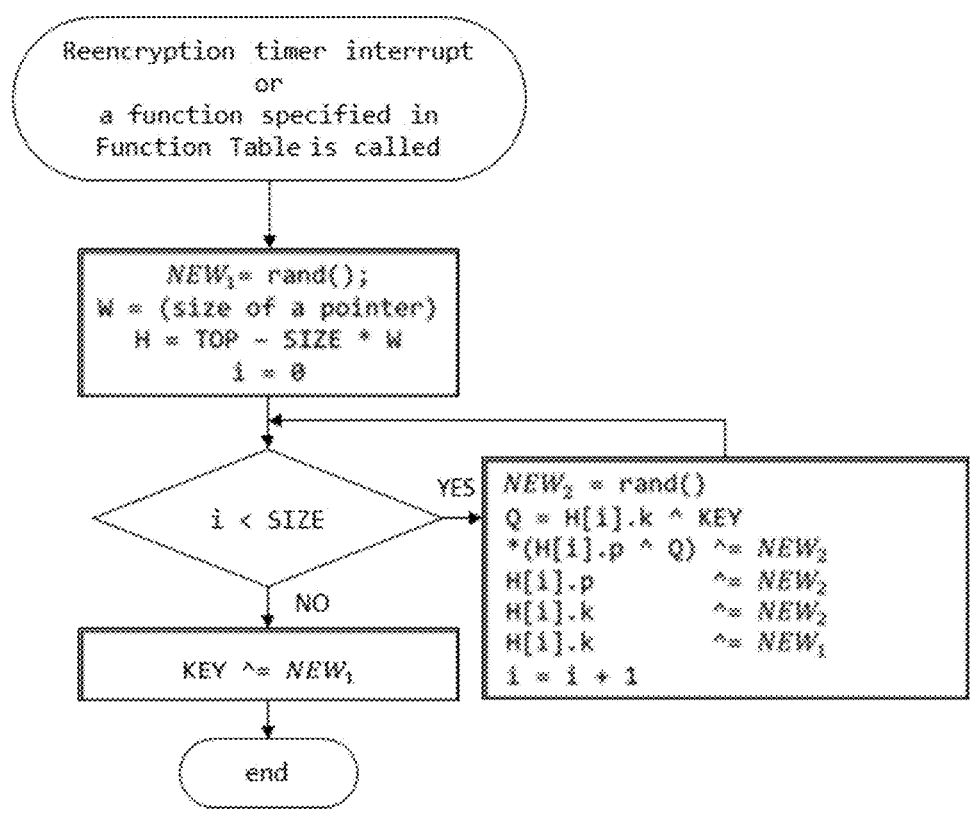
FIG. 2c illustrates a flowchart of the Reencryption module, in accordance with some embodiments of the present subject matter.
Figure 2D:
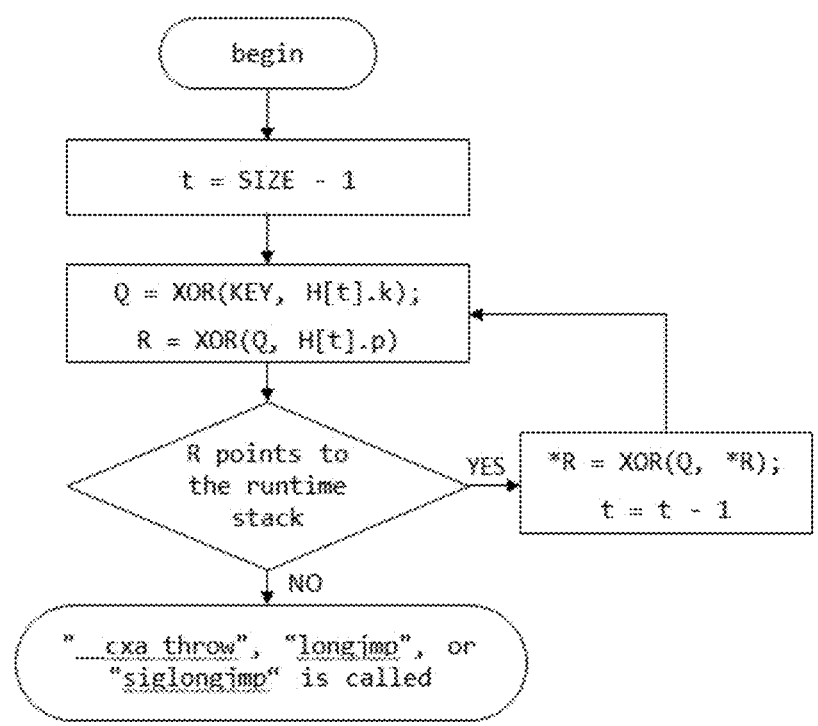
FIG. 2d illustrates a flowchart of DecryptAll module, in accordance with some embodiments of the present subject matter.
Figure 2E:
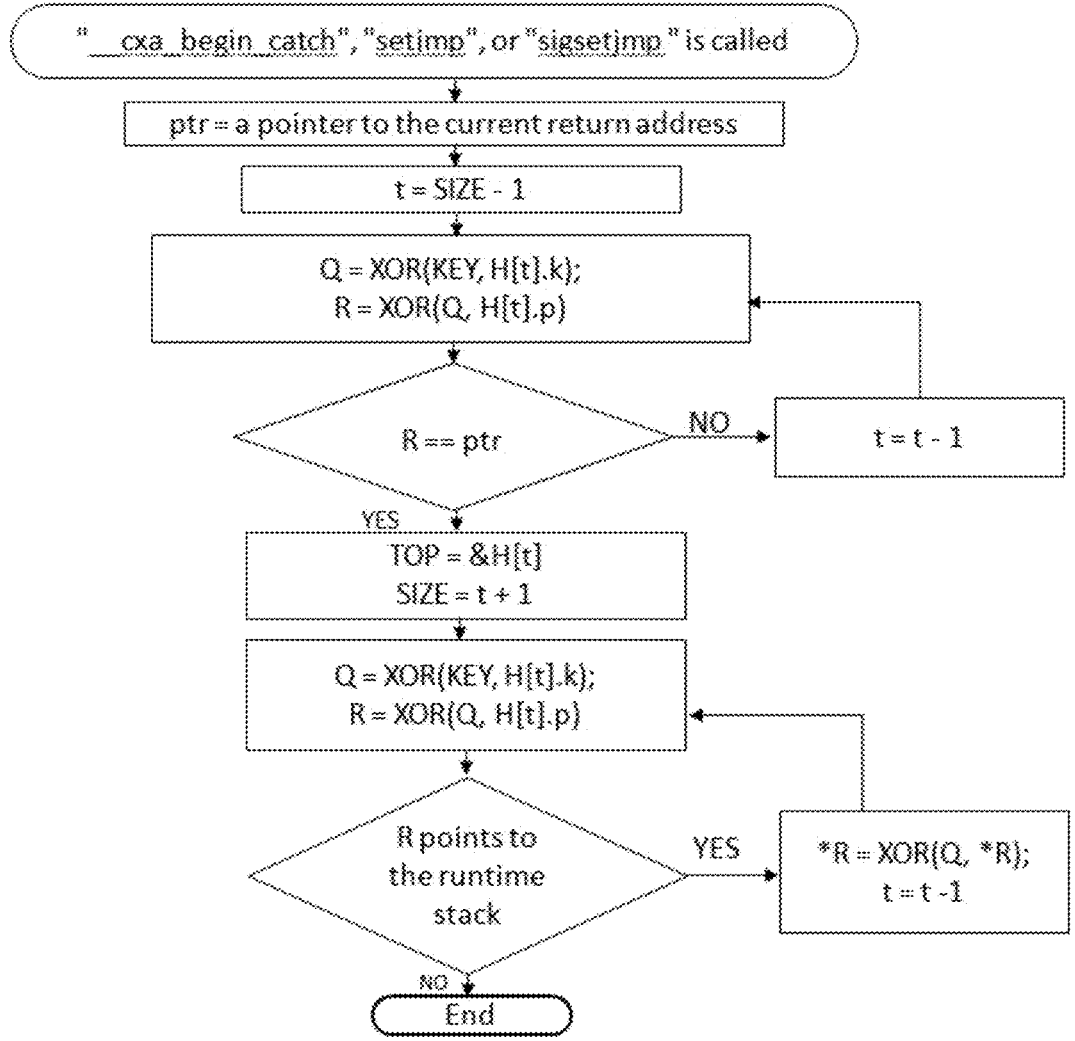
FIG. 2e illustrates a flowchart of EncryptRemainder module, in accordance with some embodiments of the present subject matter.
Figure 2F:
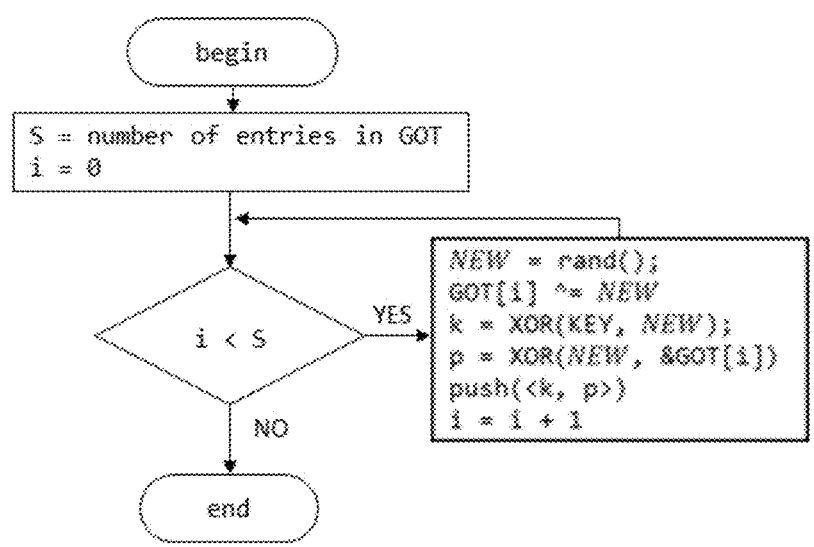
FIG. 2f illustrates a flowchart of the initial encryption of GOT entries for a shared object (dynamic linking library) and pushing the pairs of the address of a GOT entry and its corresponding key into the shadow stack, in accordance with some embodiments of the present subject matter.

The runtime library 214 includes Reencryption module, DecryptAll module, EncryptRemainder module, and others necessary for initialization of the GOT and housekeeping. Reencryption module is necessary for both periodic and aperiodic reencryption of code pointers traced by the shadow stack 212, and other modules are for initialization and aperiodic reencryption. FIG. 2c illustrates a flowchart of Reencryption module that renews the encryption states of the code pointers. This process needs random numbers $NEW_i$, i=1, 2, with the same size of the global key KEY. Iterating over pairs {$k_i$, $p_i$}, i=0, . . . , SIZE−1, in the shadow stackH, the module reencrypt each protected data *$p_i$ and the pointer $p_i$ to the data using the random number $NEW_2$. Also, the module reencrypt the private key $k_i$ using another random number $NEW_1$. Finally, the module updates the global key KEY accordingly so that it can use the key for decryption of the private keys. The random numbers $NEW_i$, i=1,2, might be generated by a random number generator. FIG. 2d illustrates a flowchart of DecryptAll module that decrypts return addresses before function cxa_throw, longjmp, or siglongjmp is called, in accordance with some embodiments. FIG. 2e illustrates a flowchart of EncryptRemainder module that encrypts the remaining return addresses afterrcxa_begin_catch, setjmp, or sigsetjmp is called, in accordance with some embodiments. FIG. 2f illustrates a flowchart of the initial encryption of GOT entries for a shared object (dynamic linking library) and pushing the pairs of the address of a GOT entry and the key corresponding to the entry into the shadow stack, in accordance with some embodiments.

The apparatus 206 may periodically reencrypt code pointers by using the interval timer 210. The timer 210 periodically interrupts the processor 202, which activates the interrupt handler 218. The interrupt handler, in turn, invokes Reencryption module of the library 214 with the saved context information that has the location and size of the shadow stack in the registers TOP and SIZE. The timer interrupt handler does not interact with the outside, and thus attacks can hardly compromise the apparatus while the handler is working. The timer's interval can be set before executing a program by the processor 202. If the interval is 0, then the periodic reencryption is disabled. While reencryption is in progress, the apparatus disables the timer interrupt.

The present system and method may also perform aperiodic dynamic reencryption that updates the encryption states of code pointers before or after vulnerable regions of programs. Instead of the timer interrupt, the code fragments inserted by the apparatus 208 for static instrumentation perform the aperiodic reencryption with the support from the apparatus 206 for dynamic reencryption. An ideal method would reencrypt code pointers before every access to memory, but this would incur significant overhead. Moreover, extremely frequent reencryption is not necessary because not all memory accesses are vulnerable. The present system achieves effectiveness with minimal performance overhead by limiting runtime reencryption to the occasions immediately before or after risky operations, which are calls to memory copy functions, process forking, and exception handling. In the following disclosure, the aperiodic reencryption of the function pointers of the GOT is explicated separately from the return addresses.

For the return address of the runtime stack, Table 1 lists the locations where the code for dynamic reencryption is inserted. The inserted code fragments are sequences of instructions or calls to the functions in the library 214, corresponding to the responsibility in the third column of Table 1. The first two groups of locations classified as static encryption accommodate the code for initial encryption when return addresses come into existence. Also, the static encryption takes the responsibility of decryption before dereferencing the encrypted code pointers. The code fragments inserted at the last six groups of locations in Table 1 reencrypt return addresses of the runtime stack 220.

TABLE 1

Instrumentation locations for runtime reencryption of return addresses

| | Instrmmentation locations | Responsibilities | Context |
|---|---|---|---|
| Static encryption | Function prologue | Initial encryption | Calls |
| | Function epilogue | Final decryption | Returns |
| Dynamic reencryption | Before risky function calls | Reencryption | Memory copy functions |
| | After spawning a child | Reencryption | Process and thread spawning |
| | Before throw | Decryption | Exception, stack unwinding begins |
| | Beginning of a catch clause | Reencryption | Exception, stack unwinding ends |
| | Before longjmp | Decryption | Stack unwinding begins |
| | After setjmp | Reencryption | Stack unwinding ends |

The code fragment inserted at the prologue of a function encrypts a return address when the function is called. The code inserted at the epilogue of the function decrypts the encrypted address when the function returns to the call location. With the static encryption only, the encryption states of return addresses stay fixed during their lifetime. The lifetime of a return address begins when a call instruction pushes the return address into the runtime stack and ends when a return instruction pops out the address from the stack.

Figure 3:
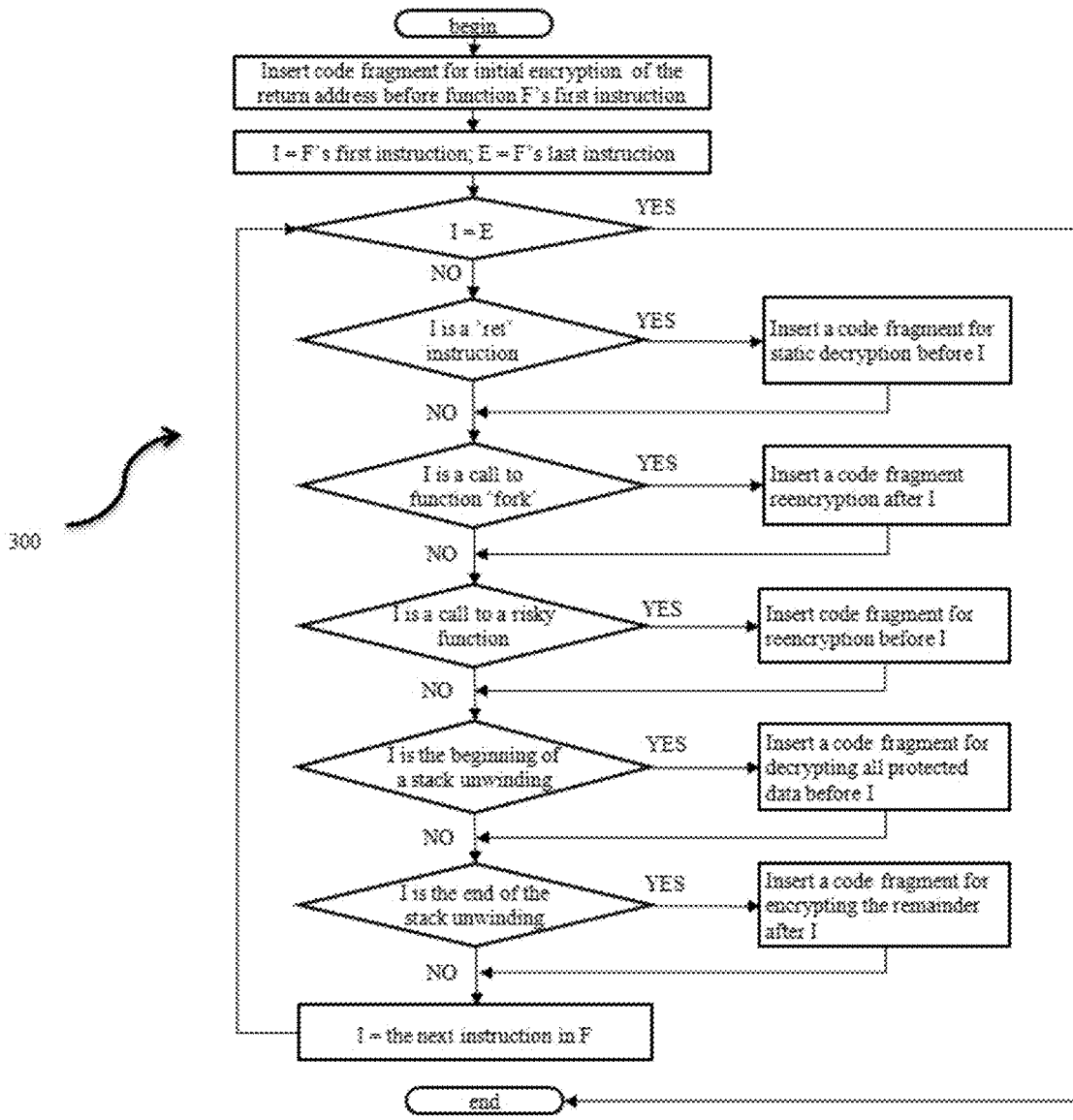
FIG. 3 illustrates a flowchart of the instrumentation for dynamic reencryption of code pointers, in accordance with some embodiments.

FIG. 3 illustrates flowchart 300 of the instrumentation by apparatus 208, in accordance with some embodiments. For each function, the apparatus inserts the code fragments for the initial encryption before the first instruction, and it also does likewise for the final decryption before every return instruction (the first and second locations of the static encryption of Table 1). The remaining parts of the flowchart insert code fragments for the six locations of the dynamic reencryption of Table 1. For every call to a risky function or fork system call listed in the function table 216, it inserts the code fragment for reencryption. Before every instruction that begins stack unwinding, it inserts the code fragment for invoking DecryptAll module. After every instruction that ends stack unwinding, it inserts the code fragment for invoking EncrpytRemainder module.

The aperiodic reencryption of the function pointers of the GOT is also initiated by the code fragments inserted at the locations for the dynamic reencryption of return addresses of Table 1. Since the shadow stack 212 indiscriminately traces the function pointers as well as return addresses, there is no difference between the return addresses and the function pointers in the GOT for the purpose of reencryption. However, instrumentation for the static encryption of the function pointers of the GOT follows steps different from the reencryption of return addresses. The static encryption of the function pointers is responsible for the initial encryption when the pointers are installed and the decryption when programs dereference the pointers. When linker produces loadable (executable) module at the last stage of compilation, the apparatus 208 also attaches the PLT (procedure linkage table) or an equivalent code fragment with the capability of decrypting the function pointers in the GOT instead of the vanilla PLT furnished by host systems. Also, the dynamic linker of the standard library 224 may perform the initial encryption of the GOT function pointers at the beginning of program execution. The functionality of the initial encryption can be embodied in the loader (execve for Linux) instead of the dynamic linker of the systems.

Following is the instruction sequences inserted by the apparatus 208 of the present disclosure for the initial encryption and final decryption of a return address.

// extended function prologue
k=rnd( );
*sp=XOR(k, *sp);
push_s({XOR(KEY, k), XOR(k, sp)});
⋮
// instructions of function body
⋮
// extended function epilogue
⋮
k=XOR(KEY, TOP→k);
*sp=XOR(k, *sp);
pop_s( );
return The code snippet inserted to extend a function prologue first produces a new key k and encrypts the return address *sp with the key k, where sp is the runtime stack pointer. Next, the snippet encrypts the pair {k, sp} to {XOR(KEY, k), XOR(k, sp)} and pushes the pair into the shadow stack by calling Function push_s( ), where KEY is the global key for randomizing all other keys. Function push so also adjusts the shadow stack pointer TOP and its size SIZE accordingly. Note that reserved registers exempt from spills store KEY, TOP, and SIZE. If a register spills into memory in the current context, adversaries may be able to read or overwrite the locations where registers spill.

Similarly, the code snippet inserted at the end of a function epilogue preceding a return instruction decrypts the return address encrypted in the prologue. When control transfers back to the caller, the snippet also removes the pair of encrypted key and stack pointer {XOR(KEY, k), XOR(k, sp)} from the shadow stack by calling function pop_x( ) that adjusts TOP and SIZE.

The present system may insert code fragments for reencryption before calling 60 copy functions classified as risky ones in the GNU C library. The collection of the risky functions is an embodiment of the function table 216 of FIG. 2a. Many functions of the standard C library, strcpy( ), memcpy( ), and strdupa( ), for example, copy bytes from one memory location to another without checking the sizes of destinations. When these functions copy data, attackers can attempt memory disclosure or a control-flow interception by forcing the functions to overwrite code pointers. Runtime reencryption precludes the possibility of successful attacks, even though the attack payload is crafted using a disclosed key because the disclosed key is valid only in a limited interval ending before reencryption. If a function is turned out to be vulnerable and thus registered as a risky one in the function table 216, the present system reencrypts code pointers whenever the function is called.

The following is an instance of the instrumentation that reencrypts return addresses in the runtime stack at line 3 before calling function strcpy. For each entry of the shadow stack, function reencrypt decrypts the entry, updates the key, locates the return address on the runtime stack, and finally reencrypts the return address at the location. Function reencrypt traverses the shadow stack, reencrypting all the code pointers whose locations are recorded in the shadow stack including the return addresses in the runtime stack and the function pointers in the GOT.

1 void foo(char * src) {
2 char dest[10];
3 reencrypt( )// an inserted function call
4 strcpy(dest, src);// a risky function call
5 }

A process inherits its memory layout from its parent. As a result, both the process and its parent would share the same set of encryption keys and encrypted return addresses unless reencryption was performed for the spawned process. If a key leaked from one of the processes, it can be exploited for compromising other processes. The present system prevents a process and its descendants from sharing keys by generating new keys and reencrypting the code pointers of every forked child. As a result, all processes have no shared encryption keys. Even when any of the processes leaks its keys, the keys become obsolete for other processes. Following is an example of a program instrumented with a code fragment for reencryption after forking a child.

1 pid=fork( ); // a risky system call
2 if (! pid) reencrypt( ); // child
3 else {// parent
4 ⋮
5 }

As for threads, the present system installs the shadow stack also in the TLS, and thus the system can reencrypt return addresses in the thread stack using the shadow stack. Since the overall security of the present system and method depends on the shadow stack, the present system takes three additional measures to hide the location and contents of the shadow stack. First, the present method initializes the TLS pages for shadow stacks with random bits, in contrast to the conventional systems' default that initializes the pages with zeros. Memory pages initialized with zeros have the weakness of information disclosure because the preceding and trailing zeros before and after shadow stacks draw the line along the boundaries of the shadow stack. This observation is valid even when the location of the shadow stack is randomized. Starting from the base address, attackers traverse the shadow stack reaping bytes that make up encrypted addresses of the locations that have return addresses or the function pointers of the GOT. Although a complex sequence of deciphering steps should follow the leaks, the disclosed bytes would serve as a strong clue to the locations of code pointers. If a code pointer leaks, the overall text segment can be probed starting from the address.

Second, to hide the location of the shadow stack, the present method also randomizes the locations of shadow stacks within their segments. The system can dynamically rerandomize the locations, but the overhead would be too high to be practical. However, even without rerandomization, attackers cannot locate an entry of the shadow stack without difficulty because the bytes preceding and following the shadow stacks have random bits. The TLSs in x86-64 systems have an additional feature beneficial for information hiding: Instructions should reference data in the TLS relatively from the segment register % fs. The register makes the leakage of the shadow stack difficult because the register does not spill into memory in the current context.

Third and finally, unused address bits of 64-bit systems are stuffed with random bits when 64-bit addresses are stored in memory. For instance, 16 higher-order bits of pointers of x86-64 processors are zeros. These higher-order zero bits would appear in both code pointers and the pointers in the shadow stacks unless an action hiding the zeros is taken. The present system fills the positions with random bits and resets them when decrypting the address data. Otherwise, the consecutive zeros become a clue about the layout of randomized memory space.

Throwing an exception or activating longjmp/siglongjmp initiates stack unwinding that deallocates stack frames and destroys any data object linked to the frames. Unwinding continues until the control-flow reaches an exception handler or a location marked by setjmp/sigsetjmp. As stack unwinding requires plain return addresses in the runtime stack, the present system maintains compatibility with stack unwinding by decrypting all encrypted return addresses before stack unwinding and reencrypting the remaining return addresses in the stack again after stack unwinding.

The following code is an illustration of the instrumentation that makes dynamic reencryption compatible with stack unwinding. Function foo calls bar, which raises an exception at line 3, but neither function foo nor bar can catch the exception.

```
1 void bar(void) {
   decryptAll( ); // restoration of plain return addresses
3 throw "exception";
4}
5 void foo(void) {
6 bar( );
7}
8 intmain(intargc, char * argv[ ]) {
9 try{
10 foo( );
11} catch(const char * msg) {
12 // reencryption of remaining return addresses
13 encryptRemainder( );
14 /* handles exception */
15 :
16}
17}
```

Figure 4:
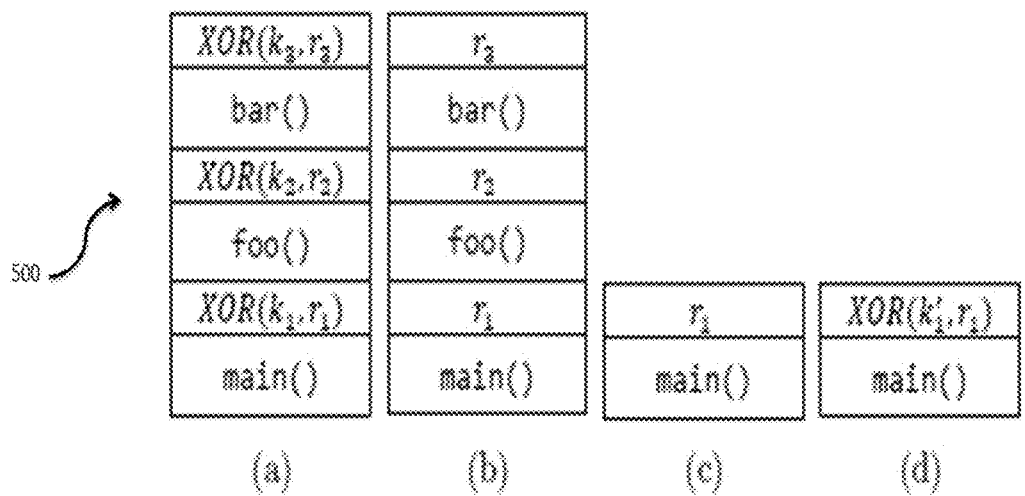
FIG. 4 illustrates a sequence of stack unwinding by the present method for dynamic reencryption of the return addresses, in accordance with some embodiments.

FIG. 4 illustrates a sequence 500 of the stack unwinding by the present method, in accordance with at least one embodiment. FIG. 4(a) shows the state of the runtime stack before the function call decryptAll at line 2 where all return addresses remain encrypted. Function decryptAll restores return addresses to plain text before function bar throws the exception, resulting in FIG. 4(b). Line 3 throws an exception that propagates up to the handler in function main. The stack unwinds until the function main's frame appears at the top, as shown in FIG. 4(c). The exception handler promptly encrypts the remaining return addresses at line 13 through function encryptRemainder. The runtime stack reaches the state illustrated in FIG. 4(d) when stack unwinding completes.

When the stack grows high, reencrypting all return addresses increases execution time. If execution speed gets too slow to be practical, the present system may operate in the modes with improved performance at a little sacrifice in security. The first variation reencrypts only the most recent return address at the top of the runtime stack. In general, the present disclosure may apply reencryption to the k>1 most recently pushed or randomly selected return addresses. Limiting the number of the return addresses subject to reencryption improves runtime overhead, especially when the height of a runtime stack grows potentially high in recursion. This variation limits the increase of execution time to a fixed constant time.

Attacks cannot avoid encountering the currently active function that occupies the top stack frame. Based on this observation, the present disclosure claims that the top return address has a higher probability of being attacked than others. Linear buffer overflow attacks cannot but overwriting the top-most encrypted return addresses. The decryption before return would crash the target program even though adversaries do not intend to exploit the overwritten address. However, direct overwriting or probing a return address at a deep level in the runtime stack may have a chance of invalidating the reencryption of the top-most k return addresses.

Another variation works with a single dynamic key per thread for every reencryption. The single key variation reduces the size of the shadow stack as well as the time overhead for reencryption. Since every encryption of a code pointer shares a single key with each other, it is necessary to entirely update encryption states of the return addresses when the variation updates the key. Additionally, it is mandatory to store the key in a dedicated register without the chance of spills to prevent leakage.

Figure 5:
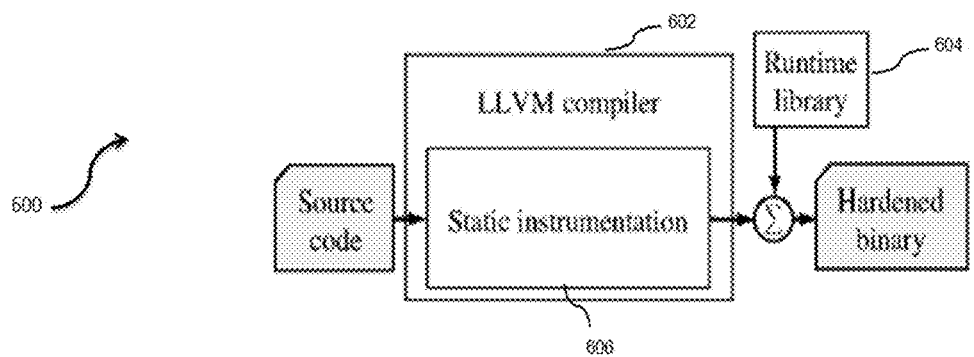
FIG. 5 illustrates an exemplary workflow of the present method for dynamic reencryption of code pointers, in accordance with some embodiments as an extension of a general compiler infrastructure.

FIG. 5 illustrates an exemplary workflow of the present method for dynamic reencryption of code pointers, in accordance with some embodiments as an extension of the LLVM compiler infrastructure 602. The extension 606 for static instrumentation inserts code fragments for dynamic reencryption at the last optimization stage to prevent the instrumented code from being swept away by otheroptimization passes. The functions defined in the runtime library 604 support the inserted code fragments. The LLVM compiler 602 with the extension 606 corresponds to the apparatus 208 in FIG. 2a, and the runtime library 604, to the modules of 214 in FIG. 2a.

The following class DRORA is an exemplar of the static instrumentation module 606 in the LLVM environment.

Class DRORA implements the virtual function runOnMachineFunction inherited from class MachineFunctionPass.

```
1 class DRORA: public MachineFunctionPass
2 {
3 void insertDRORAx64Prologue(Instruction&I);
4 void InsertDRORAx64Return(Instruction&I);
5
6    virtual    void    runOnMachineFunction (MachineFunction&F) {
7 insertDRORAx64Prologue(F.begin( ));
8 for(iterator I=F.begin( ) E=F.end( ); I!=E; ++I) {
9 if (I→isReturn( )
10 insertDRORAx64Epilogue(I);
11
12 /* UnwindBegin: cxa_throw, longjmp, siglongjmp */
13 if (I→isCall( )MUnwindBegin.has(I→getFuncName( ))
14 CreateCall("decryptAll")→insertBefore(I);
15
16 /* UnwindEnd: cxa_begin_catch, setjmp, sigsetjmp */
17 (I→isCall( )&&UnwindEnd.has(I→getFuncName( )))
18 CreateCall("encryptRemainder")→insertAfter(I);
19 } // for
20 } // runOnMachineFunction
21 }; // end of class DRORA
```

For each function in source programs, the extended LLVM compiler calls the virtual functions and inserts a code fragment for encryption or reencryption at every instrumentation point specified in Table 1 following flowchart 300 in FIG. 3. First of all, the compiler inserts the code fragment for initial encryption of a return address in a function prologue at line 7 and then iterates over instructions looking for the instrumentation points. Among those points, the call sites to functions cxa_throw, longjmp, and siglongjmp attach calls to function decryptAll to prepare for stack unwinding. Similarly, the compiler inserts calls to function encryptRemainder after the calls to cxa_begin_catch, setjmp, and sigsetjmp to reencrypt return addresses still left in the stack when stack unwinding has completed.

The runtime 604 for dynamic reencryption is built as three static libraries. Each of them corresponds to one of the default or two variations of the present disclosure. Linker selects one of them according to a compiler option –fdrora=k, k=1, 2, 3. Each static library consists of three parts. The first part defines functions reencrypt, decryptAll, and encryptRemainder.

The second part of the runtime defines wrappers for risky functions and system calls. A macro call INTERCEPTOR(., f, . . . ) defines the wrapper that intercepts the calls to function f and checks whether function f writes into the stack. If it does, the wrapper calls function reencrypt to reencrypt code pointers registered in the shadow stack before invoking function f. Otherwise, the wrapper merely transfers control to function f without security checks. The runtime also wraps system call fork as shown below at line 12 to reencrypt return addresses in the stack of a child process.

```
1 INTERCEPTOR(char *, strcpy, char *dest, const char *src){
2 if(dest>=stack_lower&&dest<=stack_upper)
3 reencrypt( )
4
5 char *ret=REAL(strcpy)(dest, src);
6 return ret;
7}
8
9 INTERCEPTOR(int, fork){
10 int ret=REAL (fork)( );
11 if (!ret)
12 reencrypt( )
13
14 return ret;
15}
```

The last part of the runtime is responsible for initialization of the TLS and registers reserved for the global key. With x86-64 processors, register XMM15 is reserved for the global key. This part enrolls the initialization routines in section .preinit_array of ELF format. This section defines an array of function pointers which the dynamic linker invokes before control-flow reaches function main. Meanwhile, to initialize the TLS and register XMM15 after creating a thread, it is necessary to define a wrapper for function pthread_create to create a thread that initializes the TLS and transfers control to the intended thread's main.

```
1 void * drora_thread_start_func(drora_tci* tci) {
2 /* initializeXMM15, shadow stack and stack boundaries */
3 initialize ( );
4 returntci→start_routine(tci→arg);
5}
6 INTERCEPTOR(int,pthread_create, void *th, void *attr,
8 void *(* start_routine)(void *), void *arg){
9 /* tci: {start_routine, arg} */
10 int ret=REAL(pthread_create)(
11 th, attr, drora_thread_start_func, tci)
12 );
13 return ret;
14}
```

The TLS has a shadow stack of sufficient size and two address constants bounding the stack segment. The compiler places data structure prefixed with thread specifier in the TLS. The initialization routine reads process memory mapping information and fills the area for a shadow stack with random bits from the host system's true random source. These random bits become the initial values of the private keys for return addresses. Also, the initialization routine randomly selects the starting address of the shadow stack and copies the address into the lower half of register XMM15. The higher half contains the global key set by the system's true random source.

The present disclosure further describes the safety of encryption keys. The present system encrypts each return address by using its private key stored in the shadow stack. In turn, the system also encrypts the private keys using the global key. The system reserves two XMM registers to keep the global key secure. The upper half of 128-bit register XMM15 stores the global key, and the lower half serves as the shadow stack pointer. Register XMM14 is a temporary used when the system updates the global key. These XMM registers do not spill except for context switching. To avoid conflicts with C library in allocating XMM registers, C standard library should be rebuilt to reserve the registers. Without reservation, the underlying LLVM compiler would freely generate code spilling the registers into a stack frame of a user process where the confidentiality of the registers cannot be guaranteed. If the registers are reserved, the kernel would spill the registers only when context switching is necessary. Consequently, the global key is secure as long as the virtual memory of a sleeping process is secure.

Further, the present disclosure explains about the probabilities of the code pointer leakages under runtimereencryption. Let a yield point of a sample space be the number of trials to provide at least the probability of 1 in guessing a fixed target belonging to the sample space. A yield point would be equal to the size of the sample space if a trial guesses a value and compares it with an element one at a time. However, the yield point can be reached earlier than the aforementioned way by incrementally probing the sample space. For example, given a 64-bit target, guessing the 64 bits requires trials of $2^{64}$ times in the worst case. However, guessing the target incrementally one byte after another can lower the yield point to $8 \times 2^8 = 2,048$ where each byte has $2^8 = 256$ bit patterns at most. A program compiled with StackGuard leaks its 32-bit canary far before the yield point. Dynamic rerandomization has been underrated as the mitigation of information leaks in the area of ASLR because rerandomization contributes to increasing entropy by a single bit. Nevertheless, the computed probabilities of an information leak under dynamic reencryption show effectiveness against incremental byte reading. Table 2 shows the probabilities of disclosure by incremental byte reading at yield points when a target is periodically reencrypted.

TABLE 2

Success probabilities of incremental attacks at yield point under dynamic reencryption

| N. Bytes (Yield points) | Periods of reencryption | | | | | | |
|---|---|---|---|---|---|---|---|
| | 1 | 4 | 6 | 128 | 256 | 1024 | 1536 |
| 1(256) | $6.33 \times 10^{-1}$ | $6.35 \times 10^{-1}$ | $6.37 \times 10^{-1}$ | $7.50 \times 10^{-1}$ | 1.0 | 1.0 | 1.0 |
| 4(1024) | N/A | $5.96 \times 10^{-8}$ | $5.94 \times 10^{-7}$ | $1.97 \times 10^{-2}$ | $1.53 \times 10^{-1}$ | 1.0 | 1.0 |
| 6(1536) | N/A | N/A | $9.10 \times 10^{-3}$ | $2.31 \times 10^{-4}$ | $7.83 \times 10^{-3}$ | $9.24 \times 10^{-1}$ | 1.0 |

Each column in Table 2 represents a period of renewing a key and encryption state. For a target in memory, the unit of the period is the number of memory accesses between reencryptions. For example, consider incrementally probing a 32-bit target. If the state of encryption does not change, the yield point to incremental bytereading is 1,024. However, the probability of disclosure under runtime reencryption with a period of 6memory accesses is $5.94 \times 10^{-7}$ at the yield point. The effectiveness of runtime reencryption enhances as the size of a target increases. For an 8-bit target, the probability at the yield point is more than 0.6 even though the target has to be reencrypted before every access. In contrast, for a 48-bit target, the probabilities of disclosure at yield points are still between $O(10^{-3})$ and $O(10^{-13})$ with periods of 256 or less. Therefore, it may be safe to increase the interval of reencryption as the target size increases.

The preceding probabilistic model assumes periodic reencryption to make the model simple. Periodic reencryption requires a monitoring process that can interrupt the monitored process and initiate reencryption when a timer or memory access counter reaches a limit. This approach makes a reencryption system complex and entails the running of another process for protection. Moreover, it is hard to balance between performance and effectiveness concerning frequency. Frequent reencryption is beneficial to program security but damaging to performance. The opposite, that is, "good performance and loose security" holds for a lengthy interval. Alternatively, aperiodic reencryption before risky operations can avoid the shortcomings of the periodic approach. A periodic reencryption can be easily embedded in a program rather than triggered as a separate process because of execution cost. Though the reencryption is activated irregularly, it would appear as continuous changes to adversaries if reencryption precedes every risky operation that may open a hole for leakage.

Figure 6:
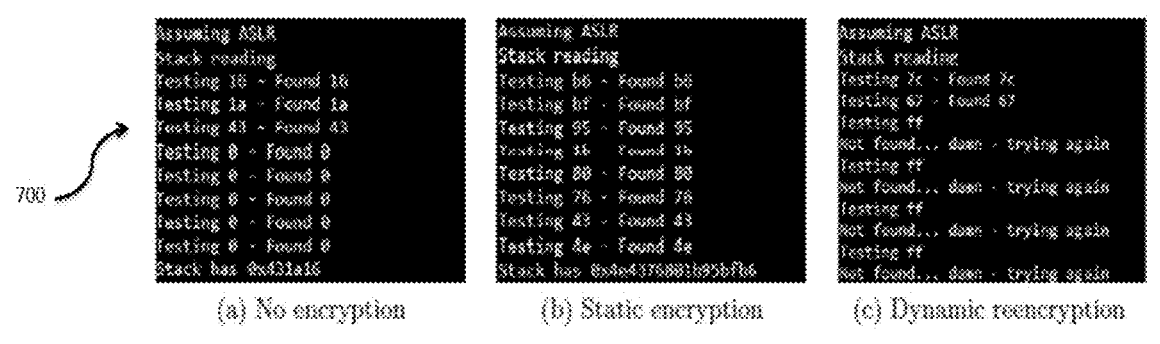

FIG. 6 illustrates an operational view 700 of the method for dynamic reencryption under an information leak attack in accordance with some embodiments. The attack is replicated in the web server Nginx following the instance of CVE-2013-2028, which is a stack buffer overflow and also demonstrated by Blind ROP (BROP) attack. BROP starts with disclosing a return address and continues the next stage of the attack using the leaked address. The test has confirmed that programs without any protection or with static encryption could not block the leaks of return addresses, as shown in FIG. 6(a) and FIG. 6(b). Dynamic reencryption, on the contrary, prevents the exploit from incrementally reading more than 2 bytes of the encrypted return address as demonstrated in FIG. 6(c). The leaked bytes are reencrypted before brute-forcing the next byte. Attackers should guess all 6 bytes at once. Since the probability of correct guesses of 6 bytes is very low, $\frac{1}{2^{48}}$, the reencryption can block the incremental brute-force memory reading as long as reencryption immediately precedes vulnerable operations.

Figure 7:
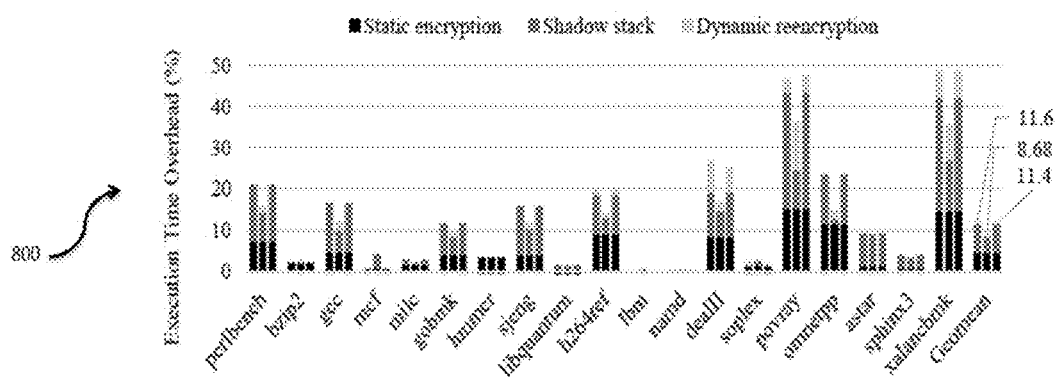
FIG. 7 illustrates a graphical view of the execution time overhead of dynamic reencryption of the return addresses on SPEC CPU2006, in accordance with some embodiments.

FIG. 7 illustrates a graphical view 800 of the execution time overhead of the dynamic reencryption on SPEC CPU2006 for CPU-bound workloads, in accordance with some embodiments. Each benchmark has three bars. The first bar shows the overhead when every return address is dynamically reencrypted with its private key. The second bar shows the reduced overhead when return addresses share a single encryption key, and the last bar shows the overhead when only the return address in the top stack frame is dynamically reencrypted. Dynamic reencryption increases execution time by 11.6% on average for SPEC CPU2006. Contrary to our expectation, the dominant source of overhead is the shadow stacks rather than runtime reencryption. Each column of FIG. 7 has the following three parts: the bottom parts represent the overhead for static encryption incurred when the addresses are pushed onto and popped from the runtime stack. The middle parts denote the increased overhead due to the shadow stacks without dynamic reencryption. The entire height of each column is the overall overhead when dynamic reencryption is in effect.

For benchmarking of IO-bound workloads, the present disclosure employed the web servers Apache and Nginx and measured the round-trip times (RTTs) of processing a request to the servers. Since the servers run perpetually, it is not appropriate to measure overheads in execution time. The present embodiment of the system and method increases the average RTT by 4.12% for Apache and 3.06% for Nginx in a single host environment, which minimizes distortion by network delay. Table 3 shows the overheads and their ingredients of the embodiment and its two variants.

Table 3. Overhead in round-trip time (RTT) of HTTP servers Apache and Nginx. The column 'ALL' is the overhead when all return addresses are dynamically reencrypted. The column '1 Key' shows overhead when the present system dynamically encrypts all return addresses with a single key. The last column, 'Top only' is the overhead for dynamically reencrypting only the return address in the top frame. The performance overhead ranges 4.12% or less for web servers.

| Programs | RTT (µ sec) | Overhead factors | Overhead (%) | | |
|---|---|---|---|---|---|
| | | | All | 1 Key | Top only |
| Apache | 38.7 | Encryption | 1.76 | 1.76 | 1.76 |
| | | Shadow stack | 1.54 | 1.51 | 1.54 |
| | | Reencryption | 0.82 | 0.22 | 0.06 |
| | | Overall | 4.12 | 3.49 | 3.36 |
| Nginx | 26.2 | Encryption | 1.58 | 1.58 | 1.58 |
| | | Shadow stack | 0.83 | 0.56 | 0.83 |
| | | Reencryption | 0.65 | 0.31 | 0.15 |
| | | Overall | 3.06 | 2.45 | 2.56 |

On the other hand, the dynamic reencryption of code pointers would seldom affect the performance of web servers in a network environment. The average RTT increases by 0.65% for Apache and 0.36% for Nginx when RTTs are measured using two hosts for server and client. More than 90% of the RTTs comes from network delays, which hide the execution time increased by dynamic reencryption. Since network delays are unpredictable and larger than execution times on the hosts, the delays hide the overheads by dynamic reencryption.

The differences in overheads of SPEC2006, Apache, and Nginx can be explained in terms of the densities of encryptions and reencryptions. The density of encryptions is the number of calls to the functions responsible for initial encryption of code pointers and the corresponding decryption. Reencryption density is defined similarly. Table 4 shows the measurements: The larger the numbers of encryptions and reencryptions are, the higher the overheads.

Table 4. Densities of encryptions and reencryptions of the benchmarks SPEC, Apache, and Nginx. The densities are the numbers of encryptions and reencryptions per second.

| Programs | Densities | | Overhead (%) |
|---|---|---|---|
| | Encryption | Reencryption | |
| SPEC | $9.15 \times 10^7$ | $7.76 \times 10^4$ | 11.6 |
| Apache | $9.89 \times 10^5$ | $1.02 \times 10^3$ | 4.12 |
| Nginx | $4.08 \times 10^5$ | $1.52 \times 10^3$ | 3.06 |

Thus, the present systems and methods provide an efficient, simple, and elegant framework for dynamic reencryption of code pointers. The framework may be implemented in the LLVM compiler infrastructure. The methods refresh the encryption states of the code pointers periodically or aperiodically. Renewal of encryption states of code pointers at runtime promotes the code pointers to moving targets and mitigates the vulnerability caused by encryption staleness, for example, the leakage of code pointers and interception of control-flow. The experimental results show that the methods can prevent recent attacks with entropy reduction or crash-resistance from disclosing encrypted return addresses and intercepting control-flow at reasonable performance overheads.

While embodiments of the present disclosure have been illustrated and described, it is apparent that the disclosure is not limited to these embodiments only. Numerous modifications, changes, variations, substitutions, and equivalents would be obvious to those skilled in the art, without departing from the scope of the disclosure.

What is claimed is:

1. A method for protecting the control-flow of a computer program against manipulation and leak of code pointers during program execution, the method comprising:
   providing a shadow stack for each process and thread of the computer program, in a thread local storage (TLS), wherein for each code pointer of the process and thread, the shadow stack stores a pair of the address of the code pointer and the corresponding encryption key;
   encrypting each code pointer with the corresponding encryption key, encrypting the pair with a global key; and
   performing reencryption of the code pointer at runtime, wherein the performing the reencryption of the code pointer comprises:
   renewing the corresponding encryption key in the shadow stack; and
   renewing the encryption state of the code pointer with a renewed encryption key when the computer program enters a code region vulnerable to a memory corruption or leak attack, such that one or more renewed encryption keys govern one or more corresponding code pointers through encryption while changing before the control-flow proceeds into the vulnerable region.

2. The method of claim 1, wherein the code pointers include return addresses.

3. The method of claim 2 further comprising limiting the number of reencrypted return addresses by reencrypting one or more recent return addresses at the top of the corresponding runtime stack.

4. The method of claim 1, wherein the code pointers include the function pointers in the GOTs (Global offset Tables) for shared objects or dynamic linking libraries.

5. The method of claim 1 further comprising providing a single dynamic encryption key for reencrypting all code pointers, and updating encryption state of all code pointers with the renewed encryption key when reencryption is necessary.

6. The method of claim 1, wherein each encryption key in the shadow stack is a unique encryption key privately used for encrypting the corresponding code pointer.

7. The method of claim 1 further comprising hiding a location and contents of the shadow stack by initializing the TLS pages of the shadow stack with random bits, and randomizing the location of the shadow stack within the segment of the TLS pages.

8. The method of claim 1, wherein the reencryption of the code pointers during runtime is performed by an inserted code fragment for dynamic reencryption of the code pointers, when a corresponding hosting compiler generates an executable binary.

9. The method of claim 8, wherein the code fragment inserted at a prologue of a function encrypts a return address when the function is called, and the code inserted at an epilogue of the function decrypts the encrypted address when the function returns to the call location.

10. The method of claim 8, wherein the aperiodic dynamic reencryption of code pointers is performed for updating encryption states of code pointers before and after vulnerable regions of programs, wherein the aperiodic dynamic reencryption is performed using a code fragment inserted for static instrumentation.

11. The method of claim 8 further comprising limiting runtime reencryption to occasions immediately before or after one or more operations in the executable binary, the one or more operations being selected from at least one of:

invoking a memory copy function, forking a process or launching a thread, and handling an exception.

12. The method of claim 11 further comprising generating a new set of keys, and reencrypting one or more return addresses and function pointers in a Global Offset Table (GOT) of a forked child, to ensure that each process has unique encryption keys.

13. The method of claim 11 further comprising decrypting one or more encrypted return addresses in a runtime stack before stack unwinding and terminating the stack unwinding when the control-flow of the program reaches an exception handler, and encrypting one or more remaining return addresses in the stack at the end of stack unwinding.

14. The method of claim 1, wherein the decryption of the encrypted code pointer during runtime is performed by an inserted code for decryption of the encrypted code pointer before the pointer is dereferenced, when a corresponding hosting compiler generates an executable binary.

15. An apparatus including a memory device that a computer program is loaded onto and a processor circuit which executes the computer program for protecting the control-flow of a program against manipulation and leak of code pointers during program execution, the processor circuit configured to execute:
   a shadow stack generation module configured to provide a shadow stack for each process and thread of the computer program, in a thread local storage (TLS), wherein for each code pointer of the process and thread, the shadow stack stores a pair of the address of the code pointer and the corresponding encryption key;
   an encryption module configured to encrypt each code pointer with the corresponding encryption key, and encrypt the pair with a global key; and
   a dynamic reencryption module configured to perform reencryption of the code pointer at runtime, wherein the performing the reencryption of the code pointer includes renewing the corresponding encryption key in the shadow stack, and renewing the encryption state of the code pointer with a renewed encryption key when the computer program enters a code region vulnerable to a memory corruption or leak attack, such that one or more renewed encryption keys govern one or more corresponding code pointers through encryption while changing before the control-flow proceeds into the vulnerable region.

16. The apparatus of claim 15, wherein the code pointers include return addresses.

17. The apparatus of claim 15, wherein the dynamic reencryption module is further configured to limit the number of reencrypted return addresses by reencrypting one or more recent return addresses at the top of the corresponding runtime stack.

18. The apparatus of claim 15, wherein the code pointers include the function pointers in the GOTs (Global offset Tables) for shared objects or dynamic linking libraries.

19. The apparatus of claim 15, wherein the dynamic reencryption module is further configured to provide a single dynamic encryption key for reencrypting all code pointers and updating encryption state of all code pointers with the renewed encryption key when reencryption is necessary.

20. The apparatus of claim 15, wherein each encryption key in the shadow stack is a unique encryption key privately used for encrypting the corresponding code pointer.

21. The apparatus of claim 15, wherein the shadow stack generation module is further configured to hide a location and contents of the shadow stack by initializing the TLS pages of the shadow stack with random bits and randomizing the location of the shadow stack within the segment the TLS pages.

22. The apparatus of claim 15, wherein the dynamic reencryption module is configured to perform reencryption of the code pointers during runtime by an inserted code fragment for dynamic reencryption of the code pointers, when a corresponding hosting compiler generates an executable binary.

23. The apparatus of claim 22, wherein the code fragment inserted at a prologue of a function encrypts a return address when the function is called, and the code inserted at an epilogue of the function decrypts the encrypted address when the function returns to the call location.

24. The apparatus of claim 22, wherein the dynamic reencryption module is configured to perform aperiodic dynamic reencryption of code pointers for updating encryption states of code pointers before and after vulnerable regions of programs, wherein the aperiodic dynamic reencryption is performed using a code fragment inserted for static instrumentation.

25. The apparatus of claim 22, wherein runtime reencryption is limited to occasions immediately before or after one or more operations in the executable binary, the one or more operations being selected from at least one of: invoking a memory copy function, forking a process or launching a thread, and handling an exception.

26. The apparatus of claim 25, wherein a new set of keys is generated, and one or more return addresses and function pointers in a Global Offset Table (GOT) of a forked child are generated, to ensure that each process has unique encryption keys.

27. The apparatus of claim 25, wherein one or more encrypted return addresses in a runtime stack are decrypted before stack unwinding and the stack unwinding is terminated when the control-flow of the program reaches an exception handler, and one or more remaining return addresses in the stack are encrypted at the end of stack unwinding.

28. The apparatus of claim 15 wherein the processor circuit is further configured to execute a decryption module configured to decrypt the encrypted code pointer during runtime by an inserted code for decryption of the encrypted code pointer before the pointer is dereferenced, when a corresponding hosting compiler generates an executable binary.

29. A non-transitory computer readable medium for protecting the control-flow of a computer program against manipulation and leak of code pointers during program execution, the non-transitory computer readable medium comprising a set of instructions, the set of instructions when executed by a processor causes the processor to:
   provide a shadow stack for each process and thread of the computer program, in a thread local storage (TLS), wherein for each code pointer of the process and thread, the shadow stack stores a pair of the address of the code pointer and the corresponding encryption key;
   encrypt each code pointer with the corresponding encryption key,
   encrypt the pair with a global key; and
   perform reencryption of the code pointer at runtime, wherein the set of instructions when executed by the processor causes the processor to:
   renew the corresponding encryption key in the shadow stack; and
   renew the encryption state of the code pointer with a renewed encryption key when the computer program enters a code region vulnerable to a memory corruption or leak attack, such that one or more renewed encryption keys govern one or more corresponding code pointers through encryption while changing before the control-flow proceeds into the vulnerable region.

* * * * *